United States Patent Office 3,752,888
Patented Aug. 14, 1973

3,752,888
2-BROMO-α-ERGOCRYPTINE AS A LACTATION INHIBITOR
Edward Fluckiger, Binningen, and Franz Troxler and Albert Hofmann, Bottmingen, Switzerland, assignors to Sandoz Ltd. (also known as Sandoz AG), Basel, Switzerland
No Drawing. Continuation-in-part of abandoned application Ser. No. 827,144, May 23, 1969. This application Sept. 17, 1971, Ser. No. 181,624
Claims priority, application Switzerland, May 31, 1968, 8,168/68
Int. Cl. A61k 27/00
U.S. Cl. 424—250
6 Claims

ABSTRACT OF THE DISCLOSURE

The invention concerns a novel method of inhibiting lactation in a warm-blooded female animal which comprises administering to the animal a dose of from about 0.03 milligram to about 10 milligrams per kilogram animal body weight of 2-bromo-α-ergocryptine.

A process for the production of 2-bromo-α-ergocryptine is also described.

---

This is a continuation in part of copending application Ser. No. 827,144 filed on May 23, 1969, now abandoned. The invention relates to a method of inhibiting lactation in a warm-blooded female animal.

In accordance with the invention, there is provided a method of inhibiting lactation in a warm-blooded female animal species, which comprises administering to the animal at intervals ranging from 4 times daily to once every ten days, a dose of from about 0.03 milligram to about 10 milligrams per kilogram animal body weight of 2-bromo-α-ergocryptine of the formula

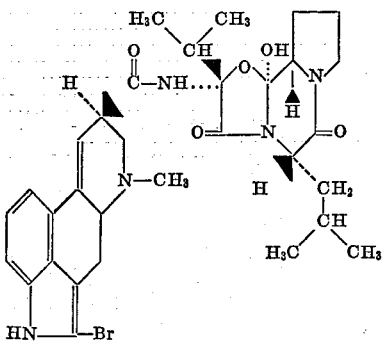

or a pharmaceutically acceptable acid addition salt thereof.

An exemplary method employed for determining lactation inhibition, which shows the principle involved in such determinations, is as follows:

Each of a number of female rats having a body weight of 180–200 g. is placed in a tub together with a breeding male. About 18–19 days later, i.e. shortly before births take place, the pregnant female animals are individually placed in fresh tubs. Only 8 young animals of a litter were left with the mother animals. The litters were weighed to the nearest gram beginning from the morning of the first day after birth. The test substance was injected subcutaneously to the lactating mother animal on the evening of the 6th, 7th or 8th day after birth. The next day the broods were weighed in the morning and in the evening and on the following days only in the morning. Young animals from control broods, the mother animals of which were treated with solvent only, show an average weight increase from the day of the injection to the morning of the following day. The weight difference provides the standard for determining lactation inhibition. The average weight increase of the young animals from the morning of the injection day to the first weighing the following morning as compared to the standard is defined as the lactation inhibition.

Different animal species exhibit different sensitivity to treatment with 2-bromo-α-ergocryptine, and hence the dosage required to obtain satisfactory inhibition of lactation varies over a fairly wide range. Thus, for example, 2-bromo-α-ergocryptine is only moderately active in inhibiting lactation in the rat at a dose as high as about 4 mg./kg. animal body weight. In the rabbit on the other hand, a lactation inhibiting effect is observed at a subcutaneous dose of about 0.5 mg./kg. animal body weight [method employed by Cowie, A. T.: J. Endocr. 44, 437 (1969)]. A single subcutaneous dose of about 1 mg./kg. in the rabbit shows a lactation inhibiting effect of about 70% which lasts for about four days. After this period, milk yield regains the pretreatment level. Subcutaneous doses of 2 and 10 mg./kg. show inhibition of milk yield to about the same extent, but at these doses no recovery is observed within nine days. Observations in a mini-pig (of a weight of about 59 kg.) showed that three intramuscular doses of 0.1 mg./kg. in one day was followed by a phase of inhibited growth of the litter, which evidenced temporary inhibition of milk production. Observations with regular pigs (of weights ranging from 150 to about 180 kg.) showed that weight gain of the litters is inhibited in a significant dose-dependent fashion at intramuscular doses between 0.03 and 0.81 mg./kg. The mg./kg. dose at which satisfactory results are obtained in larger mammals of weight greater than about 2 kg. is seen from about 0.03 mg./kg. to about 1.0 mg./kg. conveniently given in divided doses two to three times a day or in sustained release form. For the larger mammals, the total practical daily dosage is in the range of from about 3 to about 15 mg. given in divided doses 2 or 3 times a day or in sustained release form. Convenient unit dosage forms suitable for oral administration contain from about 1 mg. to about 5 mg. of the compound, in association with pharmaceutical carriers or diluents. The dosage administered will, of course, vary depending upon the mode of administration and the extent of inhibition desired.

The methane sulphonate is a convenient pharmaceutically acceptable acid addition salt form of 2-bromo-α-ergocryptine. Capsules or tablets containing the unit dose of 2-bromo-α-ergocryptine in association with starches, sugars, talcum and the like are dosage forms suitable for oral administration. Injectable solutions, for example for administration by infusion, contain the 2-bromo-α-ergocryptine in association with conventional sterile diluents.

2-bromo-α-ergocryptine may be obtained by brominating ergocryptine in an inert solvent, with a mild brominating agent, e.g. N-bromophthalimide, N-bromosuccinimide or N-bromocaprolactam, and purifying the resulting 2-bromo-α-ergocryptine.

Suitable brominating agents are amides or imides, brominated on the nitrogen atom, of aliphatic or aromatic carboxylic or sulphonic acids, e.g. N-bromophthalimide, N-bromosuccinimide or N-bromocaprolactam (1 to 3 mols) or a bromo-dioxane complex (0.5 mol $Br_2$). Bromination is conveniently effected in an inert, polar solvent, e.g. dioxane, acetonitrile, or methylene chloride, at a temperature of between 10 and 80° C.

Purification of the resulting crude 2-bromo-α-ergocryptine may be effected in conventional manner, e.g. by chromatography and/or recrystallization.

2 bromo-α-ergocryptine is a crystalline substance at room temperature and forms stable salts, which are crystalline at room temperature, with organic or inorganic acids. Examples of acids which may be used for salt formation are inorganic acids, such as hydrochloric, hydrobromic or sulphuric acid, or organic acids, such as oxalic, tartaric or methanesulphonic acid.

The following example explains in particular, a method by which 2-bromo-α-ergocryptine may be produced.

EXAMPLE.—2-BROMO-α-ERGOCRYPTINE

A solution of 3.4 g. of N-bromosuccinimide in 60 cc. of absolute dioxane is added dropwise in the dark, during the course of 5 minutes, to a stirred solution heated to 60°, of 9.2 g. of ergocryptine in 180 cc. of absolute dioxane. The reaction mixture is stirred at this temperature for 70 minutes and is concentrated to a syrup-like consistency in a rotary evaporator at a bath temperature of 50°. The reaction mixture is subsequently diluted with 300 cc. of methylene chloride, is covered with a layer of about 200 cc. of a 2 N sodium carbonate solution in a separating funnel and is shaken thoroughly. The aqueous phase is extracted thrice with 100 cc. amounts of methylene chloride. The combined organic phases are washed once with 50 cc. of water, are dried over sodium sulphate and the solvent is removed under a vacuum.

The resulting brown foam is chromatographed on a 50-fold quantity of aluminium oxide of activity II–III with 0.2% ethanol in methylene chloride as eluant, whereby the compound indicated in the heading is eluted immediately after a secondary fraction which migrates somewhat more rapidly than the fractions containing the heading compound. The last fractions to leave the aluminium oxide contain varying amounts of starting material together with the heading compound, and may be subjected directly, as mixed fractions, to an after-bromination in accordance with the method described above. The fractions containing the pure heading compound are combined and crystallized from methyl-ethyl ketone/isopropyl ether. Melting point 215–218° (decomp.), $[\alpha]_D^{20} = -195°$ (c.=1, methylene chloride).

Paper chromatographic identification

Stationary phase .................. 25% formamide.
Mobile phase .................. Ester/carbon tetrachloride (1:1).

Rf values:
    2-bromo-α-ergocryptine .................. 0.88.
    α-Ergocryptine .................. 0.70.

Methane sulphonate

From methyl-ethyl ketone. Melting point 192–196° (decomp.), $[\alpha]_D^{20} = +95°$ (c.=1, methanol:methylene chloride=1:1).

Oral dosage forms (capsules or tablets) which contain the following ingredients may be prepared by conventional techniques. Such capsules or tablets are useful for inhibiting lactation in larger female mammals at a dose of one tablet two or three times a day.

EXAMPLES 1 AND 2

Tablets and capsules suitable for oral administration

Tablets and capsules containing the ingredients indicated below may be prepared by conventional techniques and are useful in inhibiting lactation at a dose of one table or capsule 2 to 4 times a day.

| Ingredient | Weight (mg.) Tablet | Capsule |
|---|---|---|
| 2 bromo-α-ergocryptine | 1 | 1 |
| Tragacanth | 10 | |
| Lactose | 246.5 | 299 |
| Corn starch | 25 | |
| Talcum | 15 | |
| Magnesium stearate | 2.5 | |
| Total | 300 | 300 |

EXAMPLES 3 AND 4

Tablets and capsules suitable for oral administration

Tablets and capsules containing the ingredients indicated below may be prepared by conventional techniques and are useful in inhibiting lactation at a dose of one tablet or capsule 2 to 4 times a day.

| Ingredient | Weight (mg.) Tablet | Capsule |
|---|---|---|
| Active agent | 5 | 5 |
| Tragacanth | 10 | |
| Lactose | 242.5 | 295 |
| Corn starch | 25 | |
| Talcum | 15 | |
| Magnesium stearate | 2.5 | |
| Total | 300 | 300 |

EXAMPLES 5 AND 6

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in inhibiting lactation. The injectable suspension is suitable for administration once a day whereas the oral liquid suspension is suitably administered 2 to 4 times per day for this purpose.

| Ingredient | Weight (mg.) Sterile injectable suspension | Oral liquid suspension |
|---|---|---|
| 2-bromo-α-ergocryptine | 1 | 1 |
| Sodium carboxy methyl cellulose, U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminium silicate | | 47.5 |
| Flavor | | q.s. |
| Color | | q.s. |
| Methyl paraben, U.S.P. | | 4.5 |
| Propyl paraben, U.S.P. | | 1.0 |
| Polysorbate 80 (e.g. Tween 80), U.S.P. | | 5 |
| Sorbitol solution, 70% U.S.P. | | 2,500 |
| Buffer agent to adjust pH for desired stability | q.s. | q.s. |
| Water | (1) | (2) |

[1] For injection, q.s. to 1 ml.
[2] Q.s. to 5 ml.

What is claimed is:
1. A method of inhibiting lactation in a warm-blooded female mammal which comprises administering to the mammal an effective dose of 2-bromo-α-ergocryptine of the formula

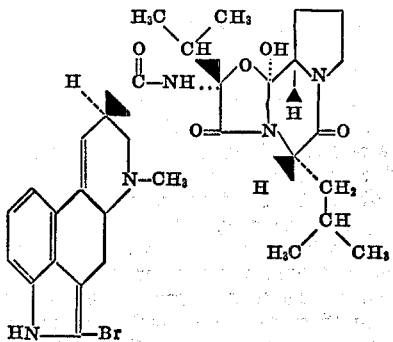

or a pharmaceutically acceptable acid addition salt thereof.

2. A method according to claim 1 of inhibiting lactation in a warm-blooded female mammal, which comprises administering to the mammal at intervals ranging from 4 times daily to once every ten days, a dose of from about 0.03 milligram to about 10 milligrams per kilogram animal body weight of 2-bromo-α-ergocryptine of the formula

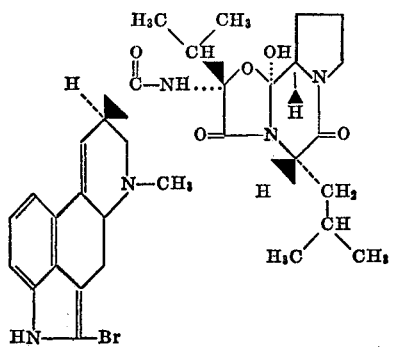

or a pharmaceutically acceptable acid addition salt thereof.

3. A method according to claim 1 of inhibiting lactation in a larger female mammal of a weight greater than about 2 kg., which comprises administering to the mammal a daily dose of from about 0.03 milligram to about 1.0 milligram per kilogram body weight of 2-bromo-α-ergocryptine of the formula

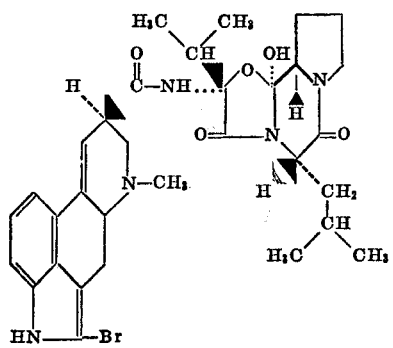

or a pharmaceutically acceptable acid addition salt thereof.

4. A method according to claim 3, wherein the dosage of from about 0.03 milligram to about 1.0 milligram per kilogram body weight is given in divided doses two to three times a day.

5. A method according to claim 4, wherein the daily dosage is administered orally to the mammal at a dose of from about 3 milligrams to about 15 milligrams.

6. A composition useful in inhibiting lactation comprising as an active ingredient thereof an effective amount of 2-bromo-α-ergocryptine of the formula

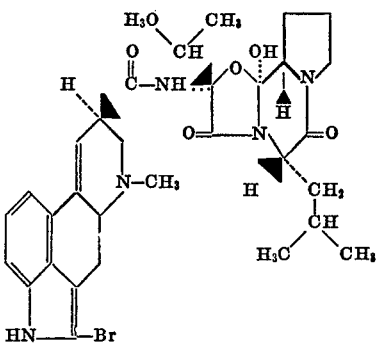

or a pharmaceutically acceptable acid addition salt thereof in combination with a pharmaceutically acceptable carrier or excipient therefor in capsule form.

References Cited
UNITED STATES PATENTS

| | | | |
|---|---|---|---|
| 2,507,831 | 5/1950 | Stoll et al. | 260—285.5 |
| 2,516,002 | 7/1950 | Hoffmann et al. | 260—285.5 |
| 3,218,324 | 11/1965 | Hoffmann et al. | 260—285.5 |

OTHER REFERENCES

Chem. Abst., vol. 70, p. 2799r (January 1969).

SAM ROSEN, Primary Examiner